W. C. THOMPSON.
DEVICE FOR SEPARATING, WASHING, AND GRADING SAND AND GRAVEL.
APPLICATION FILED SEPT. 11, 1914.
1,149,989.
Patented Aug. 10, 1915.
2 SHEETS—SHEET 1.
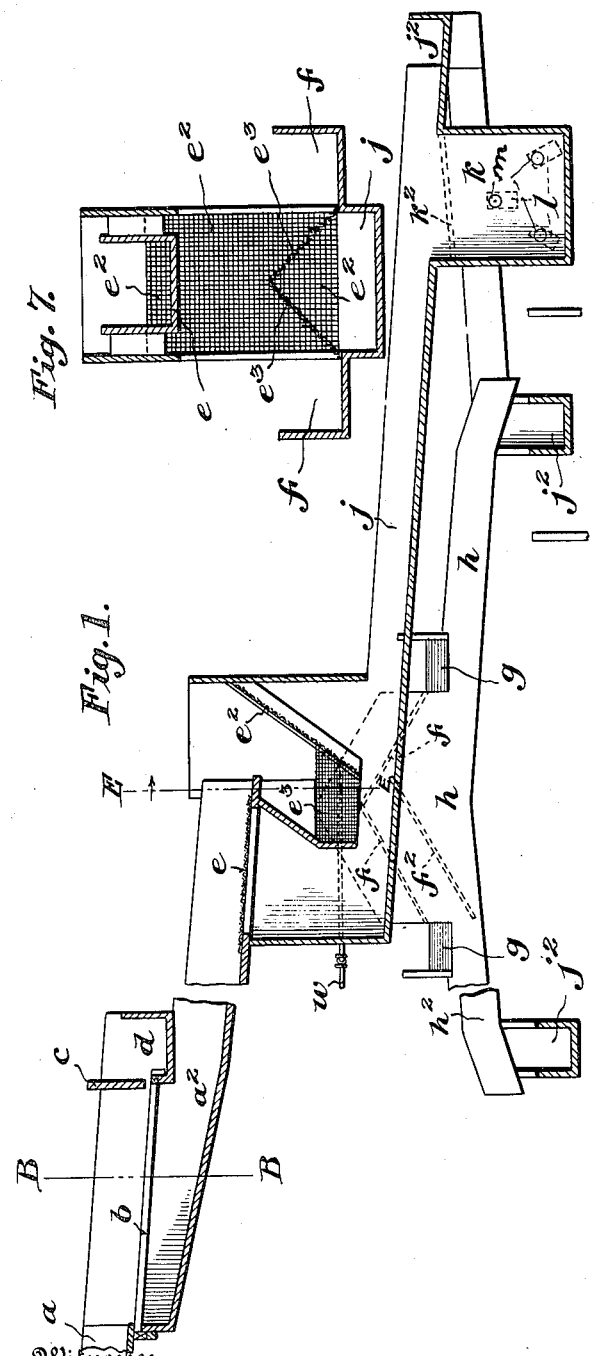
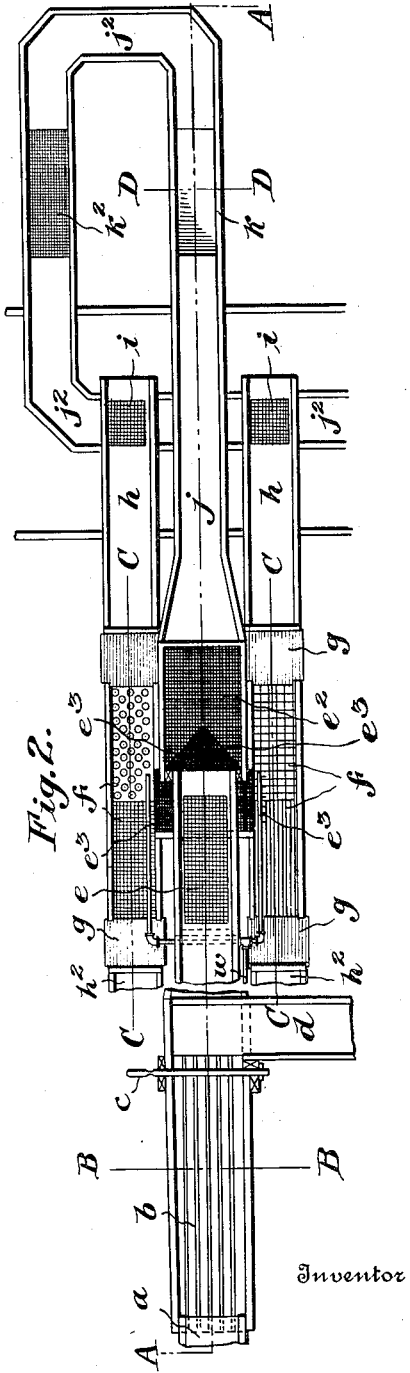
Witnesses
Lester L. Sargent.
R. J. Brown.
Inventor
William C. Thompson,
By Jerry A. Mathews
Attorney

UNITED STATES PATENT OFFICE.

WILLIAM CLAY THOMPSON, OF STEILACOOM, WASHINGTON.

DEVICE FOR SEPARATING, WASHING, AND GRADING SAND AND GRAVEL.

1,149,989. Specification of Letters Patent. Patented Aug. 10, 1915.

Application filed September 11, 1914. Serial No. 861,266.

*To all whom it may concern:*

Be it known that I, WILLIAM CLAY THOMPSON, a citizen of the United States, residing at Steilacoom, in the county of Pierce and State of Washington, have invented a new and useful Device for Separating, Washing, and Grading Sand and Gravel, of which the following is a specification.

Figure 4:
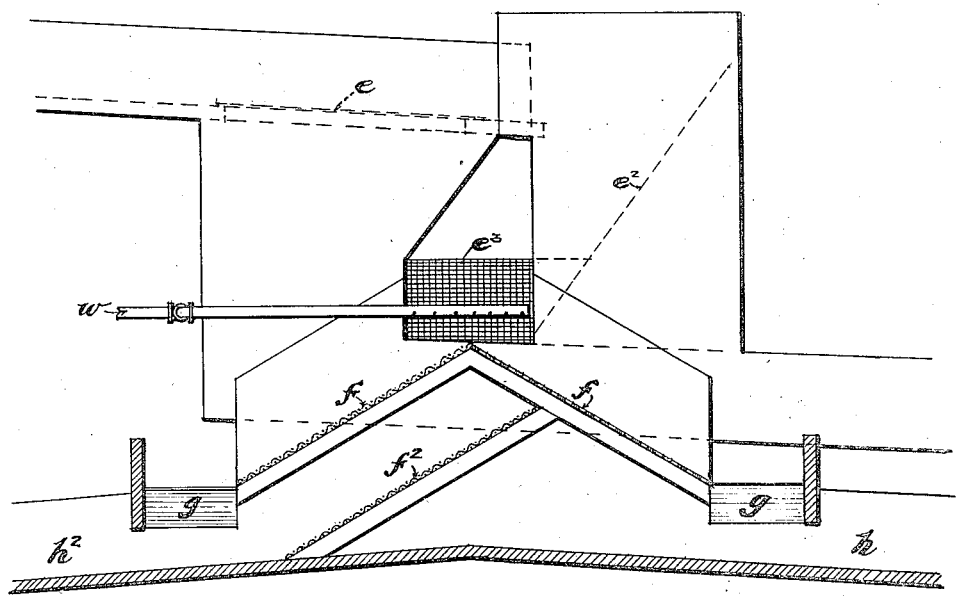
Figure 3:
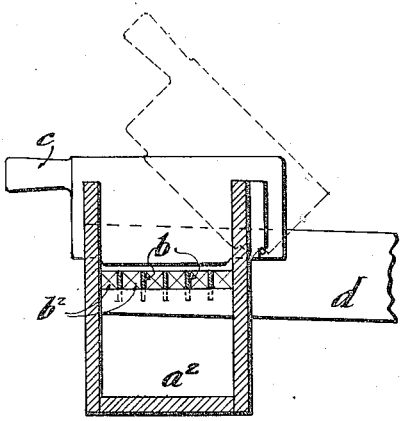
Figures 5, 6:
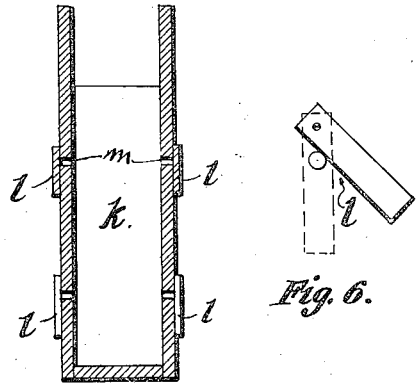

My invention relates to the separating, washing and grading of sand and gravel by gravity in conjunction with inclined screens, bars, punched plates, and so forth, and has for its object the provision of novel means whereby to render the process more expeditious and considerably cheaper than has heretofore been possible. I attain these objects by the device illustrated in the accompanying drawings, in which:

Figure 1 is a vertical section on line A—A of Fig. 2; Fig. 2 is a top plan; Fig. 3 is a vertical section on line B—B of Figs. 1 and 2; Fig. 4 is a vertical section on line C—C of Fig. 2; Fig. 5 is a vertcal section on line D—D of Fig. 2; Fig. 6 is a detail view of member 1; and Fig. 7 is a section on line E—E of Fig. 1.

Like characters of reference indicate like parts throughout the several views.

I provide a flume member $a$ for delivering the aggregate material to and over spaced bars $b$, through which water and the finer material passes into flume $a^2$ positioned beneath spaced bars $b$. At the lower end of spaced bars $b$ I provide a hinged gate $c$ to prevent the smaller material from rushing over the bars into the rock flume $d$, through which the coarser material or rock is diverted to one side. At the lower end of flume $a^2$ is a sand screen $e$ which permits water and the finest grade of sand to pass through same into sand flume $j$, as shown in Fig. 1. Spaced apart from the end of flume $a^2$ is an inclined baffle sand screen $e^2$, over which the balance of the material which sweeps over screen $e$ passes by gravity. Material too coarse to pass through the inclined baffle sand screen $e^2$ passes by gravity over saddle screen $e^3$, being thoroughly turned over and mixed in the process due to the various slopes of the screens and the dropping of the material against screen $e^2$. This operation thoroughly and effectively separates all the sand from the gravel, the sand passing through screens $e$, $e^2$ and $e^3$, together with the water, into sand flume $j$.

On opposite sides of saddle screen $e^3$, I provide gravel separators, indicated by $f$, as shown in Figs. 2 and 7. Clean water is supplied to gravel separators $f$ through perforated pipes, indicated by $w$, for thoroughly washing the gravel.

The gravel separators are provided with bars, punched plates or screens, by which the gravel is graded, according to the maximum size of fine gravel desired, which may be suitably arranged as illustrated in Fig. 2. Material above the maximum size of fine gravel desired passes by gravity over the gravel separators onto saddle plates $g$, and thence into suitable bins or other receptacles. Gravel separators $f$ consist of oppositely inclined or saddle screens (or bars or punched plates) having their lower ends contiguous with plates $g$, as illustrated in Fig. 4. The smaller material passing through separators $f$ is deposited in the oppositely inclined fine gravel flumes $h$ and $h^2$, as shown in Fig. 4. A baffle screen $f^2$ as shown in Fig. 4, diverts the necessary water into gravel flume $h^2$. Flume screens $i$ are provided in gravel flumes $h$ and $h^2$ (the latter not illustrated) to allow the wash water to pass through into waste water flumes $j^2$, such as shown in Fig. 2, and the gravel to pass over, by gravity, into bins or other receptacles as may be desired.

Sand flume $j$ is provided at its lower end with a sand box $k$, into which the sand settles. Waste water and any excess of sand passes into sand and water flume $j^2$, as illustrated in Fig. 1, and thence to waste sand dump at some convenient point outside of bins or bunkers. The material retained in sand box (or boxes) $k$ is drawn off through apertures $m$, the sand box being provided with shut-off gates or plugs $l$ for the aforesaid apertures, as shown in detail in Figs. 5 and 6.

A screen $k^2$ is provided in the upper portion of sand box $k$, with one portion thereof contiguous with flume $j^2$, as shown in Fig. 1, by which the grading of sand is accomplished, the size and angle of inclination of the screen depending upon the size of material desired. As is obvious, material failing to pass through screen $k^2$ to sand box K is swept along flume $j^2$ into the waste.

It will be understood that it is within the contemplation of my invention to vary the dimensions of flumes, boxes, screens, bars, punched plates, etc., particularly as regards their length and degree of inclination. I may also vary the type of screens, etc., as respects the relative size of mesh, etc. It is also within the contemplation of my invention to vary the direction of the various delivery flumes should such changes appear desirable, or to make other like minor changes not affecting the combination of elements essential to my process of separating, washing and grading.

The detailed operation of my device is disclosed above in connection with the description of its construction, disclosing a method of separating, grading and washing material in the aggregate without the utilization of mechanical agitating mechanism, and dependent upon hydraulic principles as pertaining to volume and velocity of flow of the aggregate, this being obtained by the proper regulation of the angle of inclination of sluices in relation to the volume of water used, as more explicitly illustrated in the preceding description, in connection with the accompanying drawings (see page 3), and comprising the deflection of rock from a mass of sand and gravel; separation of gravel from sand; and successive grading of separated sand and gravel by the operation of gravity and water operating over stationary inclined flumes and screens, in continuous flow, as illustrated in the preferred form of the invention disclosed in the accompanying drawings.

What I claim is:

1. In a device for separating, washing and grading sand and gravel, a flume having an inclined screen arranged in operative relation to its lower end, a second flume having its upper end positioned below the inclined screen to receive sand; a saddle screen positioned below the inclined screen to divert gravel into gravel separators; gravel separators for grading gravel diverted to them, means for collecting the gravel, means in connection with the sand flume for collecting the sand, and a waste sand and water flume positioned to receive and dispose of waste material from both the gravel separators and the sand separating elements, substantially as described.

2. In a device of the character described, a flume terminating in a screening member, a second flume having its upper end positioned beneath the screened portion of the first flume to receive sand and water therefrom, a screen spaced beyond and disposed at an angle to the lower end of the first flume, and a plurality of saddle screens positioned to receive and separate material failing to pass through the aforesaid screen, substantially as set forth.

In testimony whereof I hereunto affix my signature, in the presence of two witnesses.

WILLIAM CLAY THOMPSON.

Witnesses:
  JOSEPH BOWRON,
  W. L. BAIR.